US006873245B2

(12) United States Patent
del Castillo et al.

(10) Patent No.: US 6,873,245 B2
(45) Date of Patent: *Mar. 29, 2005

(54) RF REMOTE APPLIANCE CONTROL/ MONITORING NETWORK

(75) Inventors: Byron del Castillo, Palmdale, CA (US); Diane L. Ginsburg, Palmdale, CA (US); Robert C. Rosen, Tujunga, CA (US)

(73) Assignee: Architron Systems, Inc., Los Angeles, CA (US)

( * ) Notice: Subject to any disclaimer, the term of this patent is extended or adjusted under 35 U.S.C. 154(b) by 257 days.

This patent is subject to a terminal disclaimer.

(21) Appl. No.: 09/929,834

(22) Filed: Aug. 14, 2001

(65) Prior Publication Data

US 2002/0047775 A1 Apr. 25, 2002

Related U.S. Application Data

(63) Continuation-in-part of application No. 09/234,968, filed on Jan. 19, 1999, now Pat. No. 6,275,166.

(51) Int. Cl.[7] .............................................. G05B 23/02
(52) U.S. Cl. ............... 340/3.5; 340/825.07; 340/825.44
(58) Field of Search ....................... 340/3.5, 825.07, 340/825.44, 825.53, 825.73; 370/342, 335

(56) References Cited

U.S. PATENT DOCUMENTS

| 4,199,761 A | 4/1980 | Whyte et al. ........... 340/825.52 |
|---|---|---|
| 4,212,078 A | 7/1980 | Games ........................... 700/2 |
| 4,394,775 A | 7/1983 | Bruinsma ..................... 455/17 |
| 4,429,299 A | 1/1984 | Kabat ..................... 340/310.07 |
| 4,901,307 A | 2/1990 | Gilhousen et al. .......... 370/320 |
| 4,903,262 A | 2/1990 | Dissosway et al. ......... 370/327 |
| 5,021,794 A | 6/1991 | Lawrence ................... 342/457 |
| 5,087,099 A | 2/1992 | Stolarczyk ................... 299/1.6 |
| 5,265,150 A | 11/1993 | Helmkamp et al. ......... 455/555 |
| 5,364,024 A | 11/1994 | Lin ........................... 236/44 C |
| 5,390,206 A | 2/1995 | Rein et al. .................. 375/310 |
| 5,395,042 A | 3/1995 | Riley et al. ............... 236/46 R |
| 5,398,257 A | 3/1995 | Groenteman ................ 375/310 |
| 5,440,301 A | 8/1995 | Evans .................... 340/870.11 |
| 5,475,364 A | 12/1995 | Kenet ......................... 340/522 |
| 5,476,221 A | 12/1995 | Seymour ..................... 236/147 |
| 5,526,376 A | 6/1996 | Kellenberger et al. ...... 375/211 |
| 5,745,849 A | 4/1998 | Britton .................... 455/404.1 |
| 5,790,938 A | 8/1998 | Talarmo .................... 455/11.1 |
| 5,892,758 A | 4/1999 | Argyroudis ................. 370/335 |
| 6,060,996 A | 5/2000 | Kaiser et al. .......... 340/825.44 |
| 6,275,166 B1 * | 8/2001 | del Castillo et al. ......... 340/5.1 |

* cited by examiner

Primary Examiner—Brian Zimmerman
Assistant Examiner—William Bangachon
(74) Attorney, Agent, or Firm—Sheldon & Mak PC

(57) ABSTRACT

A system for managing a distributed array of appliances includes a distributed array of the units, at least some of the relay units being appliance controllers having an appliance interface. At least some communications are relayed through at least two other relay units for coverage over a wide range using low power transceivers, based on automatically generated routing tables that are maintained in the relay units.

12 Claims, 5 Drawing Sheets

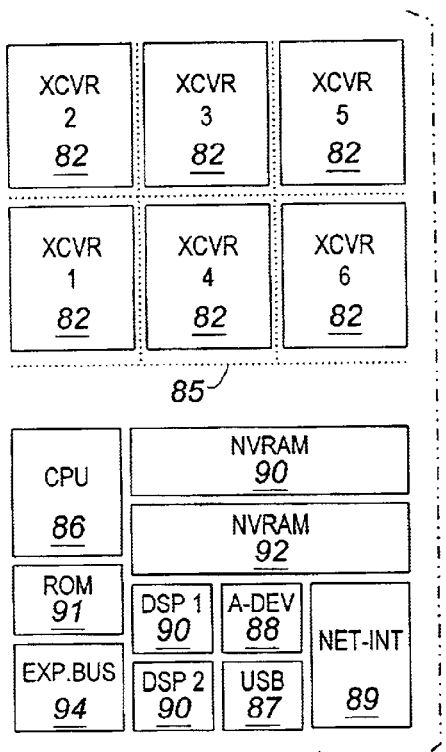
Fig. 9. 80'
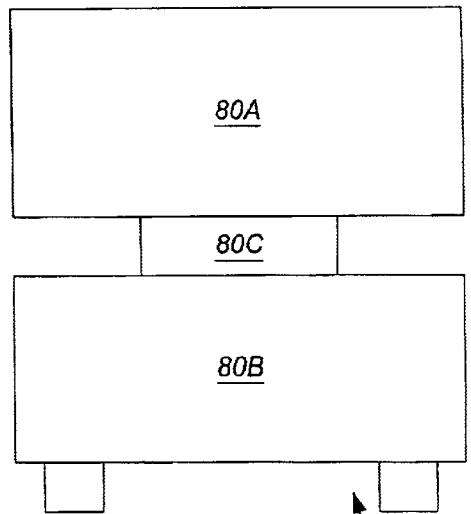
Fig. 8. 80'
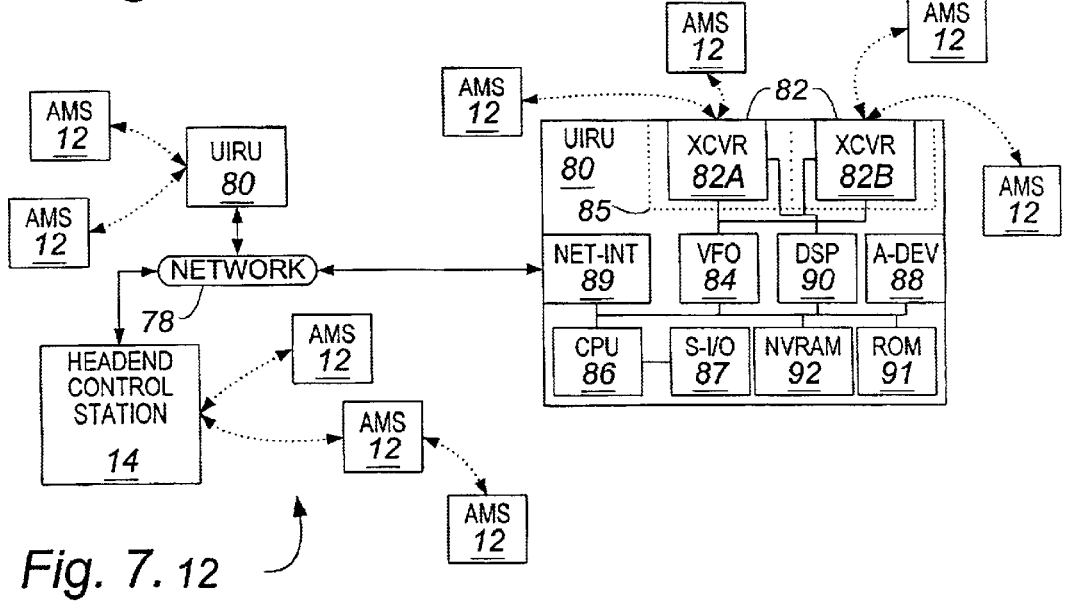
Fig. 7. 12

RF REMOTE APPLIANCE CONTROL/ MONITORING NETWORK

RELATED APPLICATION

This application is a continuation-in-part of application Ser. No., 09/234,968, filed on Jan. 19, 1999, now U.S. Pat. No. 6,275,166, which is incorporated herein by this reference.

BACKGROUND

The present invention relates to communications systems facilitating operation, control and monitoring of devices such as appliances, meters, television sets, computers, etc., and for accessing externally provided services such as telephone and television.

The control of locally distributed systems such as building systems has been undertaken in connection with commonly used computer networks and business software. See, for example, U.S. Pat. No. 4,212,078 to Games et al., which discloses a wired network, U.S. Pat. No. 4,429,299 to Kabat et al., which discloses the use of AC power wiring to transmit RF communications to remote controllers, and U.S. Pat. No. 5,440,301 to Evans and U.S. Pat. No. 5,476,221 to Seymour, which disclose control using a combination of wired and wireless communications.

Unfortunately, centralized wireless control systems for locally distributed devices have not been widely utilized, largely because systems having sufficient range normally are subject to regulations and licensing requirements that are prohibitively expensive. Also, systems that are sufficiently powerful to be used in widely distributed installations are unnecessarily expensive in smaller installations. Further, there is limited availability of RF carrier frequencies, and potential interference with other nearby systems that might be operational.

It is also known to provide increased data rates with parallel processing in a wired network environment, without requiring an expensive switching system, using multiple network connections and message passing software such as Parallel Virtual Machine (PVM).

However, none of the networking systems of the prior art has proven entirely satisfactory, exhibiting one or more of the following disadvantages:

1. They are excessively expensive;
2. They have insufficient bandwidth for certain devices;
3. They are ineffective in serving multiple devices;
4. They are unreliable; and
5. They are difficult to use.

Thus there is a need for a wireless communication system that overcomes the disadvantages of the prior art.

SUMMARY

The present invention meets this need by providing a wireless configuration that uses a distributed array of low power (short range) wireless controllers that are also functional as relay units for communicating with an external device at long range. In one aspect of the invention, an appliance controller is provided for a distributed appliance system having a multiplicity of appliances, and a plurality of relay units, one of the relay units being the appliance controller. The appliance controller includes a low power satellite radio transceiver having a range being less than a distance to at least some of the appliances; an appliance interface for communicating with the at least one local appliance; a microcomputer connected between the satellite radio transceiver and the appliance interface and having first program instructions for controlling the satellite transceiver and second program instructions for directing communication between the satellite transceiver and the appliance interface. The first program instructions include detecting communications directed by an external device relative to the same appliance controller, signaling receipt of the directed communications, and directing communications to the external device relative to the same appliance controller. The second program instructions include detecting relay communications directed between the external device and a different relay unit, transmitting the relay communications, detecting a reply communication from the different relay unit, and transmitting the reply communication to the external device, wherein at least some of the relay units communicate with the external device by relay communications using at least two others of the relay units.

Preferably each of the relay units has a unique address, each communication from the external device to the appliance controller including an address code corresponding to the unique address being selectively a relay address for communications being relayed to other relay units, the address code being a destination address when the appliance controller is the destination of the communication, the appliance controller including means for decoding the address code. Thus any distribution of relay units having the unique addresses can be accessed from the external device, as long as there is a communication path to each appliance controller that does not have a segment larger than an effective range of the transceivers. Each of the transceivers can have an effective range to another of the relay units being not less than 50 feet and not more than 1 mile. The satellite radio transceiver can have a carrier frequency of between 66 KHz and 2.6 GHz. The carrier frequency can be selectively one of at least four frequencies.

In another aspect of the invention, a system for controlling a distributed array of appliances includes a headend computer having a low power main radio transceiver interfaced thereto, the main radio transceiver having a range being less than a distance to at least some of the appliances; and a distributed array of relay units, each relay unit including a low power satellite radio transceiver having a range being less than the distance to at least some of the appliances; a microcomputer connected to the satellite radio transceiver and relay program instructions for controlling the satellite transceiver; the relay program instructions including first instructions for detecting communications directed by the headend computer relative to the same relay unit and directing communications to the headend computer relative to the same relay unit, and second instructions for retransmitting communications to other relay units. At least some of the relay units are appliance controllers, each of the appliance controllers being located proximate at least one of the appliances and further including an appliance interface for communicating with the at least one appliance. The microcomputer is also connected to the appliance interface and having destination program instructions for directing communication between the satellite transceiver and the appliance interface, wherein at least some of the appliance controllers communicate with the headend computer by relay communications using at least two others of the relay units.

Preferably each of the relay units has the unique address, the means for detecting the unique address in received communications, each communication from the headend computer to an appliance controller including the destination address and selectively one or more of the relay addresses. Each of the transceivers can have an effective range of not less than 50 feet and not more than 1 mile to another of the transceivers.

Each of the transceivers can operate at a frequency of between 900 MHz and 1.0 GHz, having an effective range of not less than 50 feet and not greater than approximately 1000 feet. Each of the transceivers can operate at a frequency of between 2.4 GHz and 2.6 GHz, having an effective range of not less than 1,000 feet and not greater than approximately 1 mile. Each of the transceivers operates at a power not greater than 100 milliwatts. The satellite radio transceiver can have a carrier frequency of between 66 KHz and 2.6 GHz. The carrier frequency can be selectively one of at least four frequencies.

In a further aspect of the invention, a method for controlling a distributed array of appliances includes the steps of:

(a) providing a distributed array of relay units, each relay unit having a satellite radio transceiver and a unique serial number, at least some of the relay units being electrically interfaced to a corresponding portion of the appliances;

(c) signaling by the transceiver of one of the relay units the addresses of at least three other relay units, one of the addresses being a destination address, the other addresses including first and second relay addresses, and a control signal for an appliance being interfaced to a destination relay unit having a serial number corresponding to the destination address;

(d) decoding the first relay address at a first relay unit having a corresponding serial number;

(e) transmitting the control signal, the second relay address, and the destination address from the first relay unit;

(f) decoding the destination address at the destination relay unit; and (g) feeding the control signal to the appliance from the destination relay unit.

The method can further include the steps of:

(a) transmitting the destination address, the first and second relay addresses, and an acknowledgment signal from the destination relay unit;

(b) decoding the second relay address at the second relay unit;

(c) transmitting the acknowledgment signal, the first relay address, and the destination address from the second relay unit;

(d) decoding the destination address and receiving the acknowledgment signal at the one of the relay units.

DRAWINGS

These and other features, aspects, and advantages of the present invention will become better understood with reference to the following description, appended claims, and accompanying drawings, where:

FIG. 7 is a block diagram showing an alternative configuration of the control system of FIG. 1;

FIG. 8 is an elevational view showing a three-tier arrangement of a relay unit portion of the control system of FIG. 7;

FIG. 9 is a block diagram of the relay unit portion of FIG. 8; and

DESCRIPTION

Figure 2:
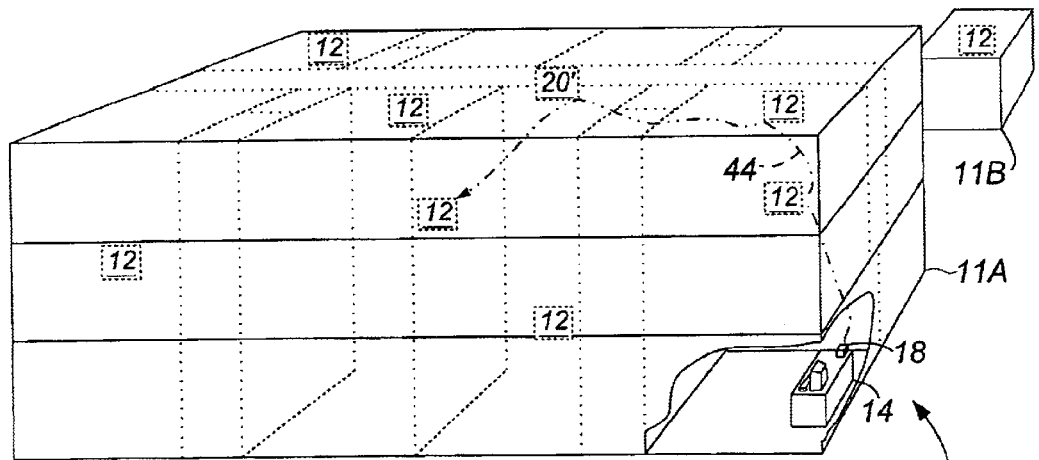
FIG. 2 is a perspective diagramic view of a building plant incorporating the system of FIG. 1.
Figure 1:
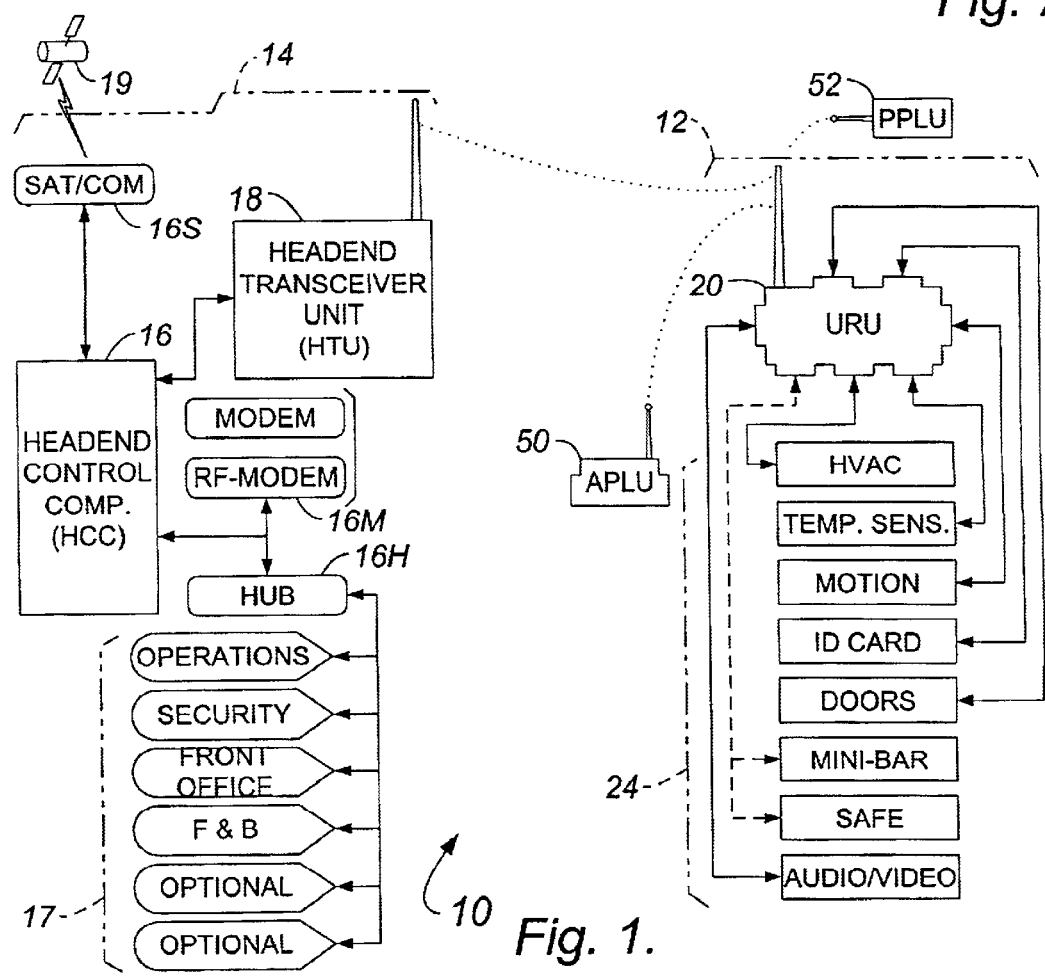
FIG. 1 is a pictorial diagram view of an appliance control system according to the present invention.
Figure 3:
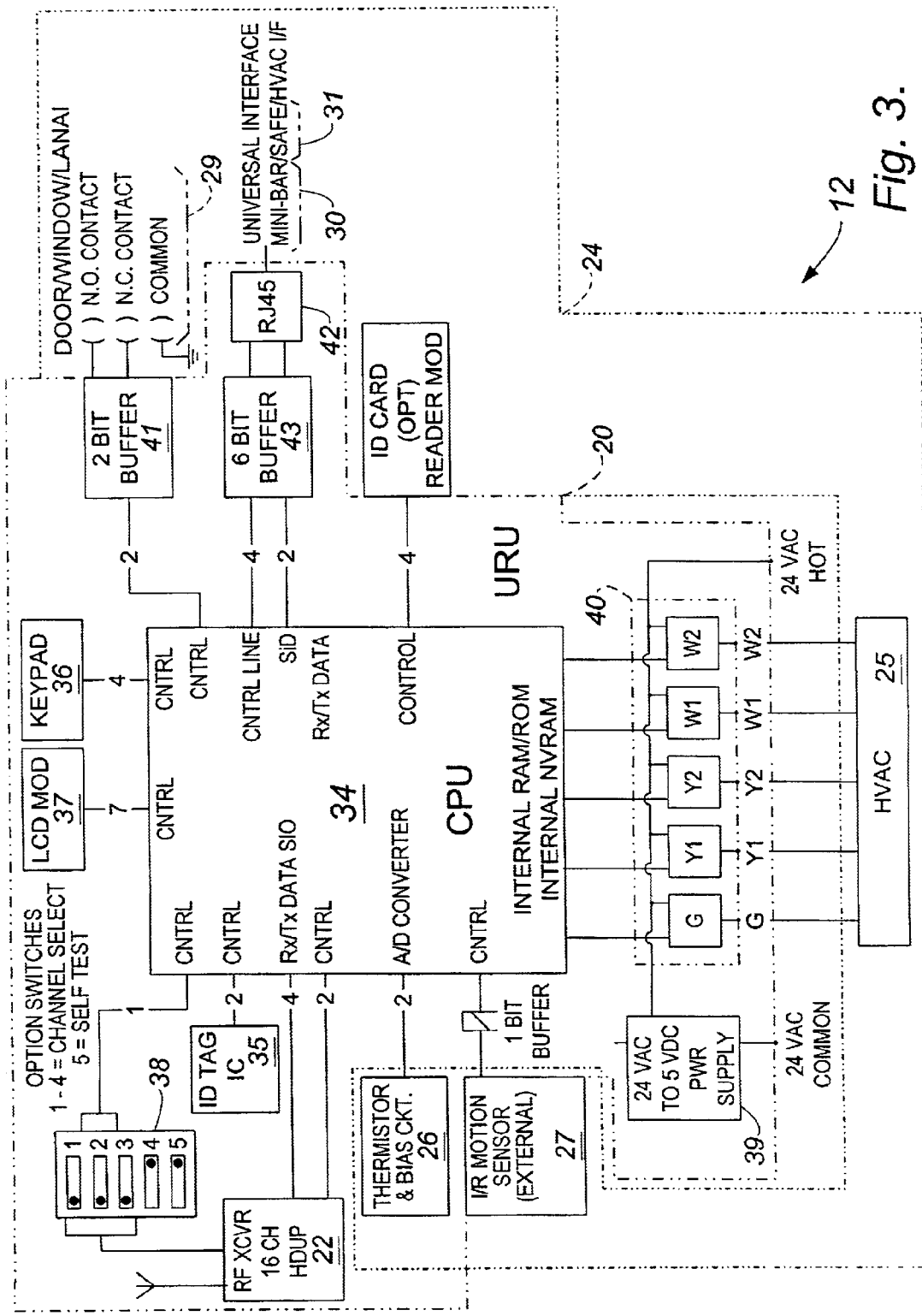
FIG. 3 is a simplified circuit block diagram of an appliance controller portion of the system of FIG. 1.

The present invention is directed to a wireless communication system that is particularly effective in a variety locally and remotely distributed configurations. With reference to FIGS. 1–3 of the drawings, an appliance management system 10 for a network environment such as a building plant 11 includes a distributed array of appliance management stations (AMSs) 12 that have wireless communications with a headend control station (HCS) 14 and/or with each other. The building plant 11 can be a service facility such as a hotel, motel, hospital, or shopping mall, a manufacturing facility, or any facility having a distributed array of appliances to be controlled and/or monitored. More generally, the building plant 11 is understood to mean any geographic area within which AMSs 12 of the system 10 are to be located. In the exemplary configuration of FIGS. 1–3, the HCS 14 includes a headend control computer (HCC) 16 that is typically interfaced to satellite terminals 17, the HCS 14 also including a headend transceiver unit (HTU) 18 for wireless communications with the AMSs 12. It will be understood that one or more of the AMSs 12 can also be interfaced to counterpart satellite terminals 17 and/or publically accessible networks such as the Internet, and to function as the HCC, alone or in concert. The HCC 16 typically includes a conventional network interface hub 16H for connecting the satellite or network terminals 17, and may also include a modem 16M for telephonic communications and/or a satellite communications link 16S. The term "satellite" in the context of the terminals 17 means "subordinate" as analogous to a follower or attendant of a higher authority, the higher authority being the HCS 14 or any particular one of the AMSs 12 that may at any given time be functioning as a HCS. In the context only of the communications link 16S (and counterparts thereof), it means a link to an earth-orbiting satellite 19 as indicated in FIG. 1. Computers suitable for use as the HCC 16 include those generally known as "personal computers", preferably having minimum specifications including an Intel Pentium® P2 processor, 128 MB RAM, 6 GB hard disk drive, 100 MB ZIP drive, 32× CDROM drive, four RS-232 I/O ports with a DB9 interface, a USB mouse port, a keyboard port, a parallel printer port, a 100 BT network interface port, a 15-inch SVGA color monitor having 0.28 mm dot pitch, and a 600 dpi laser printer having a speed of 6 ppm, 110 key keyboard, and a Microsoft 3-button USB roller mouse. Of course, as higher performance equipment becomes available at low cost, the preferred minimum specifications can be adjusted accordingly.

The HTU 18 is an RF modem that converts an RS-232 serial ACSII data stream from the HCC 16 to FSK RF modem signals. The HTU 18 contains a data buffer that is maintained in a conventional manner by an on-board microcontroller to support full RS-232 handshaking with the serial port. Transmissions are at a frequency selected from within the 900 MHz band or the 2.4 GHz band. The HTU 18 can be one of a plurality of such devices when it is desired to operate the system 10 at multiple frequencies. This can be the case, for example, when a subset of the AMSs 12 is spaced at close range, such as within 50 or 60-foot intervals up to approximately 200 feet (to be operated in the 900 MHz band), and another subset is more remotely spaced, such as within 1000-foot or up to approximately 1 mile intervals (to be operated in the 2.4 GHz band). Thus the system 10 provides high bandwidth capabilities which can also extend, for example, to the 66 MHz band. In another aspect, the system 10 provides multi-vendor capabilities. For example, four, ten or as described below in connection with FIG. 3, sixteen frequencies that can be allocated among different vendors supplying energy management, minibar stocking and management, in-room safe units, employee tracking, and personnel locating services. The multiple frequencies can also permit faster response times by simultaneously scanning groups of AMSs 12 that operate at different frequencies within the same or different frequency bands.

Each AMS 12 includes a universal relay unit (URU) 20 that incorporates a satellite transceiver 22 and is interfaced to one or more appliance devices 24. Typical appliance devices are heating, ventilation and air conditioning units (HVAC) 25, temperature sensors 26, motion detectors 27, and door transducers 29. An ID card reader 28 for tracking employees and/or customer locations within the plant 11. When the building plant 11 is a hotel or motel, other appliances include room mini-bars 30, safes 31, and audio/video devices 32.

According to the present invention, at least some of the AMSs 12 are implemented as relay units whereby the HTU 18 and each of the satellite transceivers 22 is operable at low power and having a range that reaches only a portion of the plant 11, with communications beyond that range being effected by relay transmissions utilizing intermediate counterparts of the URU 20. More particularly, an exemplary configuration of the control system 10 is implemented with each of the URUs 20 therein having a unique identification or serial number, and the HCC 16 directing each wireless communication from the HTU 18 with a destination address corresponding to the serial number of a particular URU 20, and relay addresses, if necessary, corresponding to the serial numbers of other intermediately located URUs 20 such that the communication is chained with each link of the chain being within the limited range of the transceivers. In a preferred implementation, the ID tag IC produces a 5-character hexadecimal code.

As shown in FIG. 3, an exemplary configuration each URU 20 includes a microprocessor (MPU) 34 that is connected between the satellite transceiver 22 and the appliance devices 24. The MPU 34 is also connected to an ID tag IC 35 for secure and non-volatile storage of the unique serial number, a keypad 36 for operator input, a display device such as a liquid crystal display (LCD) 37, and a switch block 38. In this exemplary implementation, one pole of the switch block 38 provides a self test signal to the MPU 34, and four poles of the switch block 38 are connected to the satellite transceiver 22 for selecting one of 16 communication frequencies. It will be understood that the frequency selection can also be implemented by other means such as interface connections to the MPU 34 that are activated in response to local operator input and/or to the HCC 16. An alternative and preferred implementation has poles of the switch block 34 selecting channels of a spread spectrum frequency set that includes at least four frequencies (typically ten) and may include 20 or more frequencies using technology known to those having skill in the art. The preferred spread spectrum implementation of the transceivers 18 and 22 in the band of from 902 to 926 Mhz yields an effective range of 1000 feet at a power level of only 100 milliwatts. The actual wattage of the transceivers would typically be set by selection of components during assembly of the HTUs 18 and the satellite transceivers 22. The carrier frequency is selectively in a set of frequencies of one of preferably at least four communication channels, the four poles of the switch block 38 of FIG. 3 being capable of addressing sixteen channels.

As typically implemented for environmental control, the AMS 12 has the full functionality of a wall-mounted thermostat. Location and mounting of this device has the same considerations as a normal thermostat. It has controls and a display that are similar to a standard digital thermostat, and the connections for the heating and cooling units in the area are the same as a standard thermostat. This unit can control a heat pump device, or a gas fired device. The descriptions of the thermostat functions are as follows:

LCD Display. The LCD 37 is a general 16 character by 1 line LCD display module (backlighting optional), and functions as the general-purpose display of the AMS 12. The functions that it will serve for the thermostat are to display the air temperature, desired temperature, fan status, heating/cooling/OFF status, and whether a remote temperature override is active.

Temperature Sensor Thermistor. This device (26), along with the MPU 34, detects actual room temperature, being mounted in a well-ventilated corner of the AMS 12.

Four Button Control. These four buttons are the manual thermostat controls, and can be fully overridden by the remote HCS 14. The functions of the three buttons are: Temperature up; Temperature Down; Heating, Cooling, Off; and Fan Auto, Fan On always.

Heating and Cooling device controls and interface lines. There are small screw terminals provided for these interconnections, labeled with industry standard symbols recognized in the HVAC industry. There is also a jumper that will allow the AMS to be configured for a gas fired heating or a heat pump configuration.

In the exemplary implementation of FIG. 3, the URU 20 is powered from a source of low voltage (24 V) AC that feeds a 5 V DC power supply 39. An HVAC driver circuit 40 is also directly powered by the 24 V AC for driving the HVAC appliances 25 in response to the MPU 34 using standard triac switch output connections G (Fan on/off control), Y1 ($1^{st}$ stage compressor cooling), Y2 ($2^{nd}$ stage compressor cooling), W1 ($1^{st}$ stage heating/or heat pump reversing valve control), and W2 ($2^{nd}$ stage heating). The door transducer 29 can be implemented with normally open and/or normally closed switch contacts and interfaced with the MPU 34 using a 2-bit buffer 41. The mini bar 30 and/or the safe 31 can have a wireless interface to the URU 20 using an infrared transceiver 42 that is connected through a 6-bit buffer 43 to the MPU 34.

The temperature control operation of the ACS is as follows:

Normal LCD Display Information. When there is no activity on the ACS keypad or personal locator, the LCD 37 displays ambient and programmed temperatures. The measurement system of degrees C or F is determined at the HCS 14. If the thermostat is turned off the programmed temperature indication is OFF. If not OFF, there are prompts for a FAN indication of AUTOMATIC or ALWAYS ON, and a UNIT indication of COOLING, HEATING or OFF. An AUTO OVERRIDE indication shows whether the HCS has automatically overridden the local manual settings of the room temperature settings. This display will only show up if there is an auto override from the HCS (such as when the room is unoccupied) and it replaces the FAN display.

Setting new room temperature. An occupant of the room can manually change the temperature by pressing either the temperature up or temperature down pushbutton. When the button is pressed the display will immediately change to the temperature setting display. The LCD temperature setting display indication flashes and changes appropriately, except that if the thermostat has been overridden by the HCS 14, then the display immediately displays AUTO OVERRIDE for 2 seconds before returning to the normal display mode. The flashing stops 5 seconds after the button was pressed last. The display will not switch to the FAN display mode during the temperature setting procedure.

Setting Fan Control. When the occupant of the room desires to manually change the fan control function of the thermostat, they will press the "FAN" pushbutton. When the button is pressed the display will immediately change to Fan Operation setting display, with the LCD 37 appropriately indicating the mode of the fan depending on sequential pressings of the button and whether the thermostat has been overridden, the display reverting to normal after 2 seconds in that event.

Heating/Cooling/OFF Control. The occupant of the room can manually change the heating/cooling/OFF function of the thermostat by pressing the "Heat/Cool/Off" pushbutton. When the button is pressed the display will immediately change to Fan Operation setting display, and the mode of the fan can be sequenced to HEATING, COOLING, and OFF, unless overridden as described above.

Generally, each URU 20 may have a subset of the elements described above in connection with FIG. 3. Most, if not all, of the URUs 20 will have at least one of the appliance devices 24 connected thereto in which case the URU 20 is in an AMS 12 as an appliance controller. In situations wherein the plant 11 does not include an appliance device 24 proximate a location that requires a relay transmission to one or more AMSs 12, a URU 20 at that location need not have an appliance device 24 connected thereto, that URU 20 functioning merely as a relay unit 20'. For example, FIG. 2 shows the plant 11 as a main three-story building 11A and a detached building 11B, and AMSs 12 connected as appliance controllers in a number of rooms of the plant 11. Also, a relay unit 20' is located in a hallway portion of the main building 11A. For the purposes of illustration, a relay communication path 44 extends from the HTU 18 by way of two AMSs 12 to the relay unit 20' and continuing to an additional AMS 12, the final AMS 12 in the path 44 being the destination of the communication path 44.

As further shown in FIG. 1, the AMS 12 may have additional communication paths to portable personal locator units including an active personal locator unit (APLU) 50 and a passive personal locator unit (PPLU) 52, the APLU 50 being battery powered and the PPLU 52 being unpowered. The PPLU 52 can be a magnetic device or a resonant circuit that interacts with the URU 20 when positioned at a distance on the order of 3 to 4 inches therefrom for signaling proximity of that particular PPLU 52. Thus the location of the PPLU 52 is inferred by its proximity to a particular one of the URUs 20. The APLU 50 can be implemented as a counterpart of the relay unit 20', but optionally without the ability to retransmit communications. Thus the APLU 50, which can be physically comparable in size to a conventional pager, is operationally effective whenever it is within range of the HTU 18 or a URU 20.

Preferably each communication from the HCS 14 through the HTU 18 results in a return transmission confirming receipt of the prior communication by the destination AMS 12. Typically, and particularly in cases involving devices that are monitored but not controlled, the HTU 18 is periodically and sequentially activated with each and every destination address of the system 10, the monitoring being effected in the return communications from the respective destination AMS 12.

Figure 4:
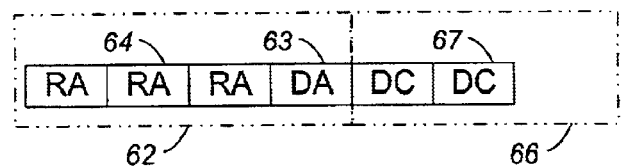
FIG. 4 is a command communication format diagram of the system of FIG. 1.

With further reference to FIG. 4, an exemplary command protocol 60 includes an address section 62 that includes a destination address 63 and may or may not include one or more relay addresses 64. Following the address section 62 is a command section 66 that includes one or more device commands 67, the device commands 67 being directed to particular ones of the appliance devices 24 at the destination AMS 12.

Figure 5:
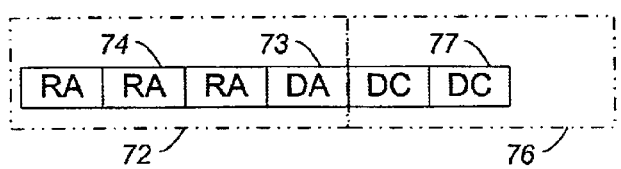
FIG. 5 is a return communication format diagram of the system of FIG. 1.

With further reference to FIG. 5, an exemplary return protocol 70 includes a counterpart of the address section, designated 72 that includes a destination address 73 and may or may not include one or more relay addresses 74. Following the address section 72 is a feedback section 76 that includes one or more feedback elements 77, the feedback elements 77 being responsive to particular ones of the appliance devices 24 at the destination AMS 12.

Figure 6:
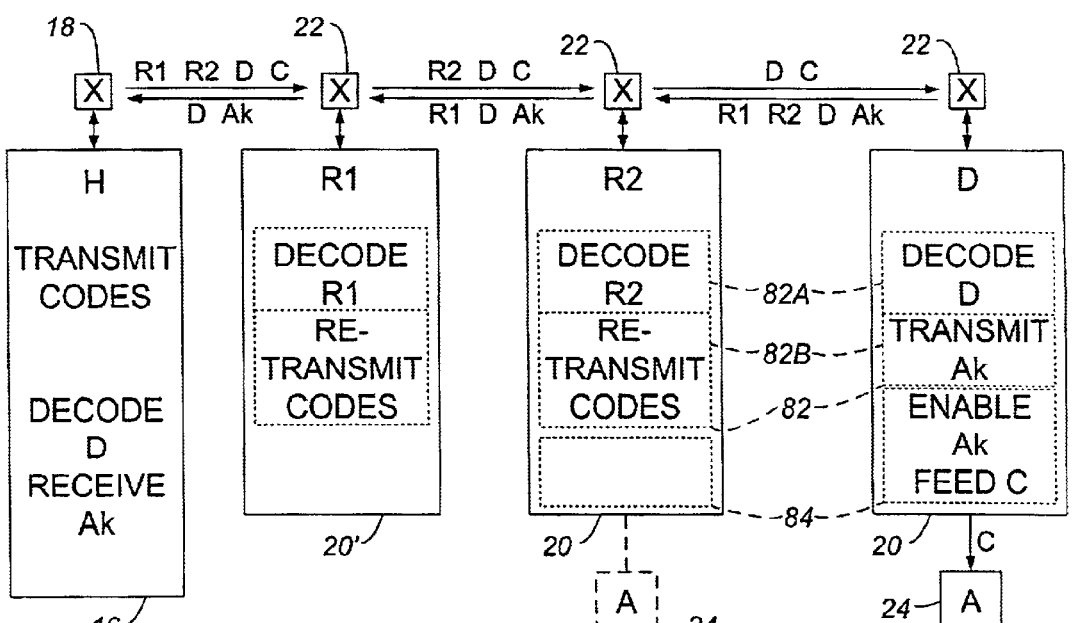
FIG. 6 is a pictorial diagram showing a process for using a portion of the system of FIG. 1.

Accordingly, and as shown in FIG. 6, the control system 10 of the present invention provides a process 80 for controlling a distributed array of appliances by the steps of signaling by the main transmitter from the headend computer H the addresses of at least three relay units, one of the addresses being a destination address D, the other addresses including first and second relay addresses R1 and R2, and a control signal C for an appliance A being interfaced to a destination relay unit D having a serial number corresponding to the destination address; decoding the first relay address at a first relay unit having a corresponding serial number; transmitting the control signal, the second relay address, and the destination address from the first relay unit; decoding the destination address at the destination relay unit; feeding the control signal to the appliance from the destination relay unit; transmitting the destination address, the first and second relay addresses, and an acknowledgment signal Ak from the destination relay unit; decoding the second relay address at the second relay unit; transmitting the acknowledgment signal, the first relay address, and the destination address from the second relay unit; and decoding the destination address and receiving the acknowledgment signal at the headend computer. In the process 80, the decoding and transmitting are effected by respective first and second instruction portions 82A and 82B of a relay program 82. Similarly, the feeding of the control signal to the appliance and generating the acknowledgment signal is effected by instructions of an appliance program 84, the programs 82 and 84 being resident in microcomputer memory of the URUs 20.

Thus the control system 10 of the present invention provides a low cost, easy to install wireless solution for monitoring and controlling appliances of a hotel, commercial or residential building. The appliances include environmental control devices, occupancy detectors, personnel tracking locators, security video monitoring, and monitoring of amenities such as in-room safes and minibars. The appliances can also include a distributed array of utility meters, such as gas meters, for example. The limited transmission distances advantageously avoid requirements for governmental site licensing. The low power transceivers are inexpensive to provide, and are effective with transmission paths that must "bend" around objects that would normally block a line-of-sight RF broadcast, particularly in that multiple alternative paths using different ones of the URUs 20 are typically available. Installation merely requires locating the URUs 20 in rooms or areas having appliances to be controlled, connecting or otherwise arranging control paths form the URUs 20 to the appliances 24 in each AMS 12, and entering the serial numbers and locations of the URUs 20 into the HCC 16. The serial numbers can be entered automatically by sequentially activating (powering) the URUs 20, starting at locations within range of the HTU 18, while the HCS sequentially attempts to interrogate the entire range of serial numbers of the URUs 20 being installed. As each URU 20 is activated, its location is manually entered, being automatically associated with the just-received serial number not having been so associated. It will be understood that automatic entry of URU 20 locations is also contemplated, such as by utilizing GPS or other position sensing, or by association of URUs 20 with physical addresses of corresponding accounts. The HCC 16 automatically determines appropriate data path routes to each of the AMSs 12 and, in the event of a URU failure, the HCC 16 automatically reroutes the data paths 44 to bypass the failed unit. This is another important feature of the system 10 that is implemented by maintaining a complete message routing table that determines alternate communications paths if any unit in the system fails to operate, also reporting the defective unit.

In an exemplary and preferred software implementation of the routing table, when enough AMS devices are installed (2 or more), the HCS 14 can be told to Auto-build the Message Routing Path Table. The HCS will then attempt to establish communication with each URU 20 that has been entered into it's database. This is done by first attempting to communicate with all of the URUs 20 that have been entered into the HCS database that are directly accessible from the HTS base station. All URUs that have been successfully communicated to are entered into the HTS database as a successful level 1 communications path.

Next, the HCS 14 will attempt to communicate with all of the URUs 20 that have been entered into the HCS database that are accessible from each of the level 1 URUs. All URUs that have been successfully communicated to are entered into the HTS database as a successful level 2 communications path. The HCS will then attempt to communicate with all of the URUs that have been entered into the HCS database that are accessible from each of the level 2 URUs, passing the message through the level 1 ACSs. All URUs that have been successfully communicated to are entered into the HTS database as a successful level 3 communications path.

The same procedure is followed in levels 4–8 as in level 3, except there is an additional link or "hop" the communications must make for each of the levels 4 through 8. In an exemplary implementation, the HCS 14 automatically builds the Message Routing Path Table to a maximum number of 8 links or "hops", but supports up to a maximum of 16 "hops", the additional ones being entered manually. At any time during the normal HTS operation, the operator can order a report that specifies which ACSs are not communicating correctly with the HCS. The report indicates whether the unit never worked or has recently failed. A recently failed unit normally requires replacement; a unit that never worked requires either replacement or another URU between it and an operating URU to act as a repeater. After initial installation, URUs 20 can be added manually, or the Auto-building of the Message Routing Path Table can be run again.

In residential applications, the system 10 provides a child tracking system for monitoring the locations of children anywhere within the neighborhood of the HTU 18 and any of the URUs 20 operating therewith. Thus the system 10 can combine the child tracking feature with energy management controls and security monitoring as described above.

With further reference to FIG. 7, an alternative and preferred configuration of the management system 10 can include a publically accessible communications network 78 in the communications path between the HCS 14 and at least some of the AMSs 12, which have a particularly advantageous implementation of the URU 20, designated UIRU 80. The UIRU 80 additionally supports Internet communications as described herein, using faster RF chip topology and increased memory capacity. As shown in FIG. 7, the UIRU 80 includes two RF transceivers 82, which are individually designated 82A and 82B. Each of the transceivers 82A and 82B includes receiver-transmitter-repeater circuitry, an appropriate antenna, a digital frequency isolation circuit and a noise cancellation circuit. Both microcircuits operate at an extremely low power consumption level and a digital control circuit monitors output power and data error rates. The output frequency is controlled by a variable frequency oscillator (VFO) 84, which allows the unit to operate in 3 different frequency bands, the 3 bands being 900 MHz, 2.4 GHz and 5.4 GHz. The unit has the capability of operating at much higher frequencies with upgrades in the future. Each section is shielded from cross talk and noise by a copper metal mesh shield 85 placed between the T/R sections on the board. The embedded microprocessor board can be either a RISC or advanced PC microprocessor (CPU) 86 for Logic, I/O control of a serial I/O interface 87 and, optionally one or more appliance devices 24, shown as an appliance interface 88 in FIG. 7. The CPU 86 is also interfaced to a high-speed (2 Gbs) network controller 89 that is coupled to the network 78, a digital signal processor (DSP) 90, 2-MB of embedded flash-ROM 91 and 128 MB of non-volatile RAM 92. The CPU 86 preferably also uses cache memory for prefetching of information and/or quick-storage of information pending transmittal.

Depending on the extent of the RF topology enhancements, this form of communications is believed to provide high-speed access with data throughput in the 128 kbps to 2.4 GBps range, with operational frequency increased to include the 5.4 GHz range, which is presently license-free. The UIRU 80 is further contemplated to be up-gradeable to new frequencies as they are allocated. The band-width requirements for the applicable operating frequencies will range from 2 MHz to 100 MHz, again dependent on the allowable FCC ranges. In the UIRU 280 the APC will receive and relay the signals in the same way control signals are sent and received in the URU 20 of FIG. 3. The major change though is in the amount of data traffic that can be sent through the controller.

Figure 10:
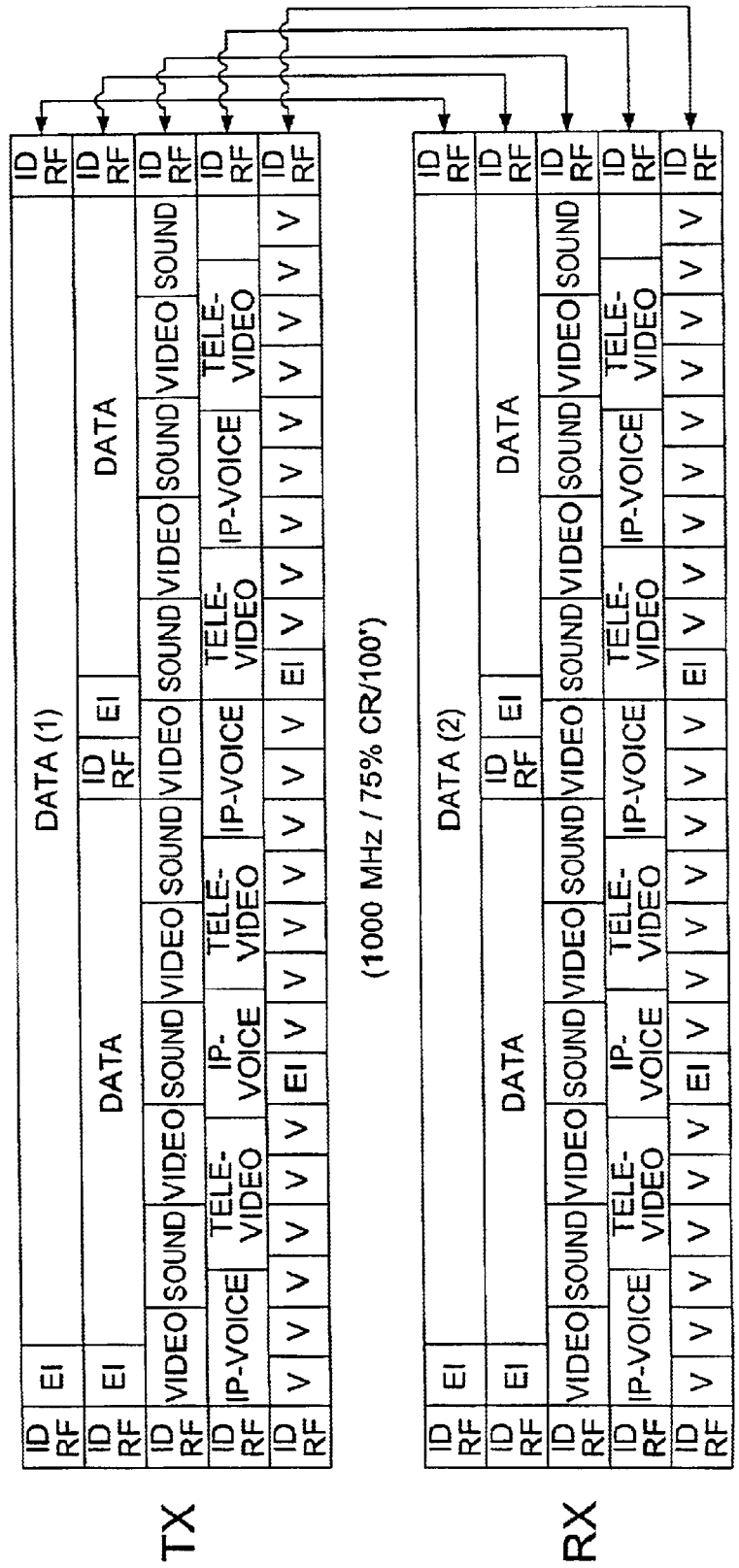
FIG. 10 is a command and return communication format diagram of the system of FIG. 7.

With further reference to FIGS. 8–10, a more preferred configuration of the UIRU 80 has a three-tier package arrangement in which the transceivers 82 are separated into an upper portion 80A from a lower portion 80B that contains the CPU 86 and associated components, an intervening central portion 80C of reduced plan dimensions mechanically connecting the portions 80A and 80B and providing a passage for suitable wiring. As shown in FIG. 9, six of the transceivers 82 are contemplated, although in many applications four would be supplied initially. In this preferred configuration, there are two DSPs 90, which each share multiple tasks which can include telephony, HDTV/NTSC signal generation and manipulation, high-speed data manipulation, video telephony, communications-mode switching (such as between CDMA, TDMA, Bluetooth, G3/802.11, GSM, etc.), as well as basic communication parameters described above. The UIRU 80 preferably includes a 64/128 bit data bus as indicated by an expansion bus 94 in FIG. 9, the DSPs 90 being connected to the CPU 86 thereby. The DSPs 90 can be plug-in devices, being preferably upgradable by firmware downloads. The inclusion of two (or more) DSPs permits the UIRU 80 to process its own receptions and transmissions concurrently with relay transmissions, using different ones of the transceivers 82.

The software resident in the units EPROM controls the operating parameters sent to the DSPs resident within the unit.

The UIRU 80 of each AMS 12 and relay unit 20' has a factory-assigned specific and unique serial number, as code resident in firmware, also resident in firmware chip are RF operating parameters for all three basic modes of communications (television, telephone, and data), and the routing table configured for determining a best use by the unit when power was first initiated. The RF communications parameters include frequency bands, bandwidth for each specific band, frequency allocation tables and RF transmitted power level restriction tables. Each of these items can be changed later by reprogramming the firmware chip via a remote download from the head-end transmitter (HTU 18) or by exchanging the firmware module. The operating parameters of firmware chips are preferably protected with a suitable encryption scheme and auto-erasable read protection that erases the firmware if an unauthorized read or copy of any sort is attempted. The firmware chip or module can also be remotely programmed to lock out a user due to lack of payment for services, or to change a table of authorized subscription services in the form of authorization codes for each subscription service optionally provided by the unit.

At power-up, each UIRU 80 preferably executes a series of self-tests, including a power supply test for proper voltages, an RF test to determine the operating frequency of installed transceivers 82, a computer test of the CPU 86, memory and associated components, and a routing table determination.

In the routing table identification (an enhancement of that described above), the UIRU 80 transmits an interrogation request signal in a wide-band broadcast form across the first of its available frequency bands: for example if the first frequency module is operating in the 2.4 GHz band it will use that band for the first interrogations. Before sending the signal the unit will scan the band to determine reflective and relative noise floor characteristics, once this is established it will send a low power, less than 200 mW signal to determine its own ambient reflections when operating at that frequency. Once the data is recorded in the firmware's RF tables, the unit will broadcast a High Power pulse signal containing its identification information. Units operating within the vicinity will then reply to the unit, the unit will then scan the responding units and record in the RF table the id's of at least 7 of the most powerful (closest) units in the area. Once this information is recorded it will submit a test data pattern at high speed to the other units, and wait for the same data to return to perform data error checking. Once this step has been completed the unit will send a data-table request to the units so that it may record the RF tables and location information of the adjacent units and add it to its own table just created along with helping the unit determine its own physical location via RF triangulation. These complex tasks are completed within the first 3–5 minutes of powering on the unit. All this information is then stored within the routing table. In this improved routing table determination there is no requirement for data from the HCS 14, or for operator intervention.

In the initial power-up cycle, there is also testing of the DSPs 90, with frequency and Bandwidth signals generated within the DSPs to match requirements set forth within the RF tables of the unit. The multiple RF transceivers then respond to control signals from the DSP to generate the specific required frequencies across one or more of the transceivers. For example:

A unit receives a request from a user's connected PC to send and fetch a large amount of data from a website. The UIRU 80 receives the request and relays it to the ISP by first buffering the request in memory, then quickly scans the surrounding units to see which one is available and which band is available for signal transmission once an ACK (Acknowledge) signal is received, the UIRU 80 then transmitting the data using as many frequencies as needed to get the required signal bandwidth.

Typical telephone conversations have a very narrow bandwidth in the 22 khz range; superior audio clarity can be achieved with a 44 khz signal. The Units automatically adjust the bandwidth dependent on the signal being sent for best results. Received video transmissions are spread across multiple bands in steps; for example, 150 Channels are spread across a bandwidth of cumulative 500 MHz with 2.4 GHz to 2.7 GHz allowing for 300 MHz of available bandwidth; 5.4 to 5.6 GHz allowing for 200 MHz; 900 to 910 MHz allowing for 10 MHz. The cumulative total of the three is 510 MHz of bandwidth. To achieve a successful transmission at that high rate the UIRU 80 must transmit simultaneously on all 3 bands. This is accomplished by dividing the outgoing data into manageable RF pulses each of, which contains packets of highly compressed data; data compression ratios are in the 50–75% range dependent on the data being sent. The packets are then allocated a transmission band by the DSP, which in turn then tags each packet with a signal identifier at the beginning and end of the transmission. This signal identifier contains data specific information on the complete size of the packet before division and the ID number and location information of the UIRU 80. In this respect, an exemplary scheme of bandwidth allocation is illustrated in FIG. 10, for a 500+ Mbps data transmission speed, a 250+ Mbps secondary fall-back transmission speed, to service six high resolution television channels, four video/telephone channels, and 24 IP-telephony channels.

Rather than sending and receiving information within a specified bandwidth when communicating, the UIRU 80 utilizes digital spread spectrum frequency hopping that constantly changes the operating frequency about 100 times per second, within an allocated band. Further, the frequency hopping is across multiple bands as well as within the bands. In certain high-frequency communications the unit will also transmits in multiple bands simultaneously as indicated above. A typical data stream consists of a packet of information up to 5 Mb in size. This packet contains as described above a unit ID and start and ending data keys. The data key is the RF table information, packet size information and data type for the packet being sent by the user. The packet is then cached into memory in preparation for transmission by the unit's RF section. When the unit receives a response from the next unit in the vicinity able to relay the transmission the unit will send the data to that location and so forth till the data stream is received by service provider for processing. If the message is going to another user within the network it is automatically routed directly to the user. Elements such as email, video-clips and such are dispatched to the appropriate location as requested by the user.

The head-end can include multiple router units, electronically the same as the end-user models though in a different physical configuration. Also like the end-user units the RF sections of the units can be daisy chained to allow for more frequency channels. A core unit, whether it be a end-user model or a head-end model can accommodate up to 24 RF transceivers or 3 extra RF sections per CPU. Each of those sections uses completely modular RF transceiver modules, 6 per section and each easily removed and replaced by the end-user or a factory repair facility. The operating frequencies and modes of the installed units are controlled by the DSPs 90, as previously described, so full signal penetration is easily obtainable. Full penetration in all directions would be obtained by installing 8 units, each with 24 channels for 192 operating channels. Each of those channels would accommodate a certain amount of users, or data type. Some channels can be strictly for telephone, others being assigned to television signal generation, or live videoconference feeds.

The channels assigned by the head-end for telephony are restricted and secure, by not only switching sub-frequencies 100 times per second but also by switching the main communications frequency as described earlier. Each basic unit is able to provide up to 24 Channels per unit solely dedicated to telephone. This is in basic 4–6-transceiver configuration. Each channel being the equivalent of a standard telephone line. Providing 24 khz to 44 khz of bandwidth per channel.

Further applications for the management system 10 of the present invention include the following:

A. Wireless Automated Meter Reading device (WAMR). This application allows utility companies to receive income from a secondary revenue stream off existing customers, such as by providing Internet access and other services.
 B. Wireless Internet Module (WIM). The WIM controller allows the APC to communicate with a local ISP at a very high data transfer rate. Switching frequencies every second, for security purposes. The embedded RF transceiver and specially designed antenna allows the controller to communicate long range multi-point without the need for separate repeaters or even a centralized communications facility. Each controller once connected to a customers PC can perform the same function as a single ISP. In essence each module can receive signals from other controls in range and relay communications back and forth between them. The range of these devices is increased exponentially as the signal is rerouted through the other APC's. The overall outcome of this network is a wireless Internet topography. Each controller acts as a router and data server.
 C. Portable Wireless advertising Video Information Servers (WVIDS)
 The WVIDS system uses a basic WIM module except it also allows for tracking, and live data/video feeds, a typical use being as a remote advertising and data terminal incorporating a 15" flat color display panel, a WIM module, and an embedded microprocessor with 64 MB ram and 4 gigabyte hard-drive. Each unit is then encased so that only the flat display panel is visible and protected by a hard-plastic case. These units can be installed in Taxi cabs, Buses and airport Limousines. Each unit will allow a central facility to address each individual unit wirelessly for ad updates on a real-time basis. Traditionally advertising on taxi's has been placed on top of the cab or on the sides, same on buses. Ad agencies will have real-time modification and update capability via the Internet.
 D. Television signal transmission and reception (WTV), including HDTV. WTV gives the APC another capability, television signal transmission. The number of HDTV channels can increase as greater RF bandwidth becomes available.
 E. Wireless virtual reality signal, including two-way transmission (WVR). Though virtual reality has yet to evolve into an actual commercially viable product due to limitations in current hardware and software designs, VR is expected to be a big hit in the computing industry. Projected enhancements to the Internet are expected to make possible real-time VR experiences to individuals connected to the Internet. The VR experiences can range from educational tours of zoo's and museums, VR book reading and movies to vacations and Virtual Employment (VE). Called virtual presence today, this ability to allow remote manipulation of devices can thus be provided without the need for wires. Virtual worlds created and stored at VRNET sites can have the capability of instantly networking virtual neighborhood's. By placing an APC headset on, the individual will then transmit to the central VRISP his personal data file and VR data file. Connections to the VRNET are preferably not autonomous, for maintaining control over the environment and offering security to institutions and individuals connected. A VRNET site can be dedicated to education as well as gaming, wherein individuals in different locations can play and interact in the virtual games of their choice. The VR headset can also interact with a VRNET site to generate catalogs for users.
 F. Wireless Interactive Television (WIT). WIT is expected to play a major role in the communications industry. An APC connected to host televisions or embedded in the televisions themselves allows viewers to interact will shows they watching, while providing broadcasters and advertisers with real-time monitoring of viewer habits. A Wireless Rating Network (WRN) can monitor behaviors such as channel changes during commercials, and switching back afterwards. This information is currently available in statistical form only.
 G. Wireless Video Security monitoring (WVS).
 H. Wireless Video Gaming (WVG).
 I. Wireless home & neighborhood networking (WHN).
 J. Wireless Revenue Controller (WRC), such as for vending machines, video game machines, slot machines, laundromats, etc.
 K. Wireless telephone appliance (WTA).

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. An appliance controller for a distributed appliance system having a multiplicity of appliances, and a plurality of relay units, one of the relay units being the appliance controller and comprising:

(a) a low power satellite radio transceiver having a range being less than a distance to at least some of the appliances;

(b) an appliance interface for communicating with the at least one local appliance;

(c) a microcomputer connected between the satellite radio transceiver and the appliance interface and having first program instructions for controlling the satellite transceiver and second program instructions for directing communication between the satellite transceiver and the appliance interface;

(d) the first program instructions including detecting communications directed by another of the relay units relative to the same appliance controller, signaling receipt of the directed communications, and directing communications to the other of the relay units relative to the same appliance controller; and (e) the second program instructions including detecting relay communications directed between the another of the relay units and a different relay unit, transmitting the relay communications, detecting a reply communication from the different relay unit, and transmitting the reply communication to the other of the relay units, wherein at least some of the relay units communicate with others of the relay units by relay communications using at least two others of the relay units.

2. The appliance controller of claim 1, wherein each of the relay units has a unique address associated therewith, and each communication from the other of the relay units to the appliance controller includes an address code corresponding to the unique address being selectively a relay address for communications being relayed to other relay units, the address code being a destination address when the appliance controller is the destination of the communication, the appliance controller including means for decoding the address code.

3. The system of claim 1, wherein each of the transceivers has an effective range to another of the relay units being not less than 50 feet and not more than 1 mile.

4. The system of claim 1, wherein the satellite radio transceiver has a carrier frequency of between 66 KHz and 5.4 GHz.

5. The system of claim 4, wherein the carrier frequency is selectively one of at least four frequencies.

6. The system of claim 4, wherein the carrier frequency is selectively in a set of frequencies of one of at least four communication channels.

7. A system for controlling a distributed array of appliances, comprising:

(a) a distributed array of relay units, each relay unit comprising:
 (i) a low power satellite radio transceiver having a range being less than the distance to at least some of the appliances;
 (ii) a microcomputer connected to the satellite radio transceiver and relay program instructions for controlling the satellite transceiver;
 (iii) the relay program instructions including first instructions for detecting communications directed by another of the relay units relative to the same relay unit and directing communications to the other of the relay units relative to the same relay unit, and second instructions for retransmitting communications to different relay units;

(b) at least some of the relay units being appliance controllers, each of the appliance controllers being located proximate at least one of the appliances and further comprising:
 (i) an appliance interface for communicating with the at least one appliance; and
 (ii) the microcomputer being also connected to the appliance interface and having destination program instructions for directing communication between the satellite transceiver and the appliance interface, wherein at least some of the appliance controllers communicate with others of the relay units by relay communications using at least two others of the relay units.

8. The system of claim 7, wherein each of the relay units has a unique address associated therewith and means for detecting occurrences of the unique address in communications from others of the relay units, and each communication from the headend computer to an appliance controller includes a destination address being the address of that appliance controller and selectively includes one or more relay addresses being the addresses of relay units to repeat the communication.

9. The system of claim 7, wherein each of the transceivers has an effective range of not less than 50 feet and not more than 10 miles to another of the transceivers.

10. The system of claim 7, wherein the satellite radio transceiver has a carrier frequency of between 66 KHz and 5.4 GHz.

11. The system of claim 10, wherein the carrier frequency is selectively one of at least four frequencies.

12. The system of claim 10, wherein the carrier frequency is selectively in a set of frequencies of one of at least four communication channels.

\* \* \* \* \*